US008841854B2

United States Patent
Soma et al.

(10) Patent No.: US 8,841,854 B2
(45) Date of Patent: Sep. 23, 2014

(54) DRIVING DEVICE FOR DISCHARGE LAMP, LIGHT SOURCE DEVICE, IMAGE DISPLAY APPARATUS, AND DRIVING METHOD FOR DISCHARGE LAMP

(75) Inventors: Shigeyasu Soma, Muroran (JP); Tetsuo Terashima, Chino (JP)

(73) Assignee: Seiko Epson Corporation, Tokyo (JP)

( * ) Notice: Subject to any disclaimer, the term of this patent is extended or adjusted under 35 U.S.C. 154(b) by 542 days.

(21) Appl. No.: 12/618,363

(22) Filed: Nov. 13, 2009

(65) Prior Publication Data

US 2010/0123406 A1    May 20, 2010

(30) Foreign Application Priority Data

Nov. 14, 2008    (JP) .................. 2008-292333

(51) Int. Cl.
  *H05B 41/36*    (2006.01)
  *H05B 41/292*    (2006.01)
(52) U.S. Cl.
  CPC ........... *H05B 41/2928* (2013.01); *Y02B 20/208* (2013.01)
  USPC ............ 315/246; 315/291; 315/294; 315/297
(58) Field of Classification Search
  USPC .......................... 315/246, 250, 291, 294, 297
  See application file for complete search history.

(56) References Cited

U.S. PATENT DOCUMENTS

| 6,181,066 B1 * | 1/2001 | Adamson ....................... 315/282 |
| 7,479,742 B2 | 1/2009 | Matsui et al. |
| 7,508,144 B2 | 3/2009 | Yamauchi et al. |
| 2004/0000880 A1 * | 1/2004 | Ozasa et al. .................. 315/291 |
| 2005/0206326 A1 * | 9/2005 | Suzuki et al. ................. 315/246 |

FOREIGN PATENT DOCUMENTS

| CN | 1867220 A | 11/2006 |
| CN | 101119607 A | 2/2008 |
| JP | A-2005-071921 | 3/2005 |
| JP | A-2006-59790 | 3/2006 |
| JP | A-2006-332015 | 12/2006 |
| JP | A-2007-87637 | 4/2007 |
| JP | 2007-250236 | * 9/2007 |
| JP | A-2007-250236 | 9/2007 |
| JP | A-2007-273175 | 10/2007 |
| JP | A-2008-34187 | 2/2008 |
| JP | A-2008-60071 | 3/2008 |

\* cited by examiner

*Primary Examiner* — Douglas W Owens
*Assistant Examiner* — Jonathan Cooper
(74) *Attorney, Agent, or Firm* — Oliff PLC (57) ABSTRACT

A driving device for a discharge lamp includes: an alternating current supply section adapted to supply two electrodes of the discharge lamp with an alternating current; a frequency modulation section adapted to modulate a frequency of the alternating current, which the alternating current supply section supplies, in accordance with a predetermined condition of the discharge lamp within a range between a predetermined upper limit frequency and a predetermined lower limit frequency; and a modulation condition setting section adapted to set a modulation condition of the frequency by the frequency modulation section, wherein the modulation condition setting section sets the modulation condition so that the lower limit frequency when the discharge lamp is in a first state is higher than the lower limit frequency when the discharge lamp is in a second state in which a flicker is harder to occur than in the first state.

24 Claims, 11 Drawing Sheets

FIG. 4A  ANODE PERIOD OF PRIMARY MIRROR SIDE ELECTRODE

FIG. 4B  END POINT OF ANODE PERIOD OF PRIMARY MIRROR SIDE ELECTRODE

FIG. 4C  START POINT OF CATHODE PERIOD OF PRIMARY MIRROR SIDE ELECTRODE

OCCURRENCE OF ARC IN RATED POWER MODE

FIG. 6A

LOW FREQUENCY DRIVING

ANODE PERIOD            CATHODE PERIOD

FIG. 6B

HIGH FREQUENCY DRIVING

ANODE PERIOD            CATHODE PERIOD

OCCURRENCE OF ARC IN LOW POWER MODE

FIG. 7A

LOW FREQUENCY DRIVING

ANODE PERIOD          CATHODE PERIOD

FIG. 7B

HIGH FREQUENCY DRIVING

ANODE PERIOD          CATHODE PERIOD

FIG. 8A  RATED POWER MODE

FIG. 8B  LOW POWER MODE

DRIVING DEVICE FOR DISCHARGE LAMP, LIGHT SOURCE DEVICE, IMAGE DISPLAY APPARATUS, AND DRIVING METHOD FOR DISCHARGE LAMP

This application claims priority to Japanese Application No. 2008-292333 filed in Japan on Nov. 14, 2008, the disclosure of which is hereby incorporated by reference in its entirety.

BACKGROUND

1. Technical Field

The present invention relates to a driving technology of a discharge lamp lighted by discharge between the electrodes.

2. Related Art

As a light source used in image display apparatuses such as projectors, there is used a high-intensity discharge lamp such as a super high-pressure discharge lamp. In such a super high-pressure discharge lamp, the arc used as the light source is formed between projections provided to the electrodes. Therefore, it is proposed that the projections are formed on the tips of the electrodes, and in order for forming the arc originated from the projections, an alternating current having a signal with a frequency lower than a stationary frequency inserted in a signal with the stationary frequency is supplied to the super high-pressure discharge lamp (see, e.g., JP-A-2006-59790).

Further, it is proposed that in order for stabilizing the arc bright spot in the case in which the current (a lamp current) supplied to the super high-pressure discharge lamp is reduced due to rise in the voltage (the lamp voltage) between the electrodes of the super high-pressure discharge lamp or reduction in the lighting power, an alternating current having a signal with a lower frequency inserted is supplied to the super high-pressure discharge lamp under the condition of reducing the lamp current (see e.g., JP-A-2006-332015).

However, even if the alternating current having a signal with a lower frequency inserted is supplied to the super high-pressure discharge lamp under the condition of reducing the lamp current, the projections with preferable shapes may not be formed depending on the conditions of the electrodes, and flickers caused by migration of the bright spot of the arc might occur. This problem not only arises under the condition of reducing the lamp current, but also arises commonly in driving the discharge lamp under the condition apt to cause flickers such as an exhausted electrode.

SUMMARY

In view of the problem described above, an advantage of some aspects of the invention is to more reliably prevent the flickers from occurring.

The invention can be put into practice as the following aspects or application examples.

A first aspect of the invention is directed to a driving device for a discharge lamp comprising an alternating current supply section adapted to supply two electrodes of the discharge lamp with an alternating current, a frequency modulation section adapted to modulate a frequency of the alternating current, which the alternating current supply section supplies, in accordance with a predetermined condition of the discharge lamp within a range between a predetermined upper limit frequency and a predetermined lower limit frequency, and a modulation condition setting section adapted to set a modulation condition of the frequency by the frequency modulation section, wherein the modulation condition setting section sets the modulation condition so that the lower limit frequency when the discharge lamp is in a first state is higher than the lower limit frequency when the discharge lamp is in a second state in which a flicker is harder to occur than in the first state.

When the frequency of the alternating current is low, the heat generation of the electrode caused by discharge is dispersed into the entire projection of the tip of the electrode. If the heat generation is dispersed into the entire projection, melting of the projection is not sufficiently executed, and therefore, the tip of the projection might be planarized. If the projection is thus planarized, the flicker is caused by the arc occurring at random positions on the planarized surface. Further, if the flicker occurs under the condition in which the flicker is apt to occur, the position of the arc migrates, thereby further dispersing the heat generation into the entire projection to further make the planarization of the tip of the projection progress. Therefore, by setting the lower limit frequency of the alternating current in the first state in which the flicker apt to occur to be higher than the lower limit frequency of the alternating current in the second state in which the flicker is hard to occur as in this aspect of the invention, it becomes possible to prevent the heat generation from dispersing into the entire projection, and to prevent the planarization of the projection, thereby more reliably preventing the flicker from occurring.

A second aspect of the invention is directed to the driving device for a discharge lamp of the first aspect of the invention, wherein the modulation condition setting section sets the modulation condition so that the upper limit frequency when the discharge lamp is in the first state is higher than the upper limit frequency when the discharge lamp is in the second state.

In the case in which the frequency of the alternating current is high, heat generation is concentrated to the area of the arc generated once, and a part of the projection is sufficiently melted. Further, in the melted portion of the projection, the force applied to the opposed electrode is also concentrated. Therefore, according to the this aspect of the invention, since growth of the elongated projection is promoted at the position of the arc once generated, it becomes possible to stabilize the position at which the arc occurs, and to further stably prevent the flicker.

A third aspect of the invention is directed to the driving device for a discharge lamp of either of the first and second aspects of the invention, wherein electrical power of the alternating current in the first state is lower than electrical power of the alternating current in the second state.

In general, by reducing the electrical power of the alternating current, the amount of heat generation in the projection is reduced, and the possibility of failing to sufficiently melt the projection is further increased. Further, drop of the temperature of the electrode and the projection causes migration of the position from which the thermal electron is emitted, which makes the flicker be more apt to occur. Therefore, by raising the lower limit frequency in the first state in which the electrical power of the alternating current is low as in this aspect of the invention, it is possible to more reliably prevent the flicker even in the state in which the electrical power of the alternating current is low and there is a high possibility of generating the flicker.

A fourth aspect of the invention is directed to the driving device for a discharge lamp of the third aspect of the invention, wherein in an early stage in the first state after the discharge lamp is switched from the second state to the first state, the frequency is set to be higher than a predetermined frequency.

Since the temperature of the electrode and the projection is raised in the second state in which the electrical power of the alternating current is high, the temperature in the early stage of the first state becomes higher than in the case in which the first state continues. Therefore, by raising the frequency of the alternating current in the state in which the projection is easily melted, since the growth of the elongated projection is further promoted to stabilize the position at which the arc occurs, it becomes possible to reliably prevent the flicker.

A fifth aspect of the invention is directed to the driving device for a discharge lamp of any one of the first through fourth aspects of the invention, wherein the frequency modulation section modulates the frequency along a modulation pattern including a plurality of periods with frequencies different from each other, and the modulation condition setting section sets, in accordance with the first and second states, modulation patterns corresponding respectively to the first and second states in the frequency modulation section.

According to this aspect of the invention, by providing the plurality of periods with frequencies different from each other, the projections corresponding to the respective frequencies are stably formed.

A sixth aspect of the invention is directed to the driving device for a discharge lamp of the fifth aspect of the invention, wherein the modulation pattern corresponding to the first state is a modulation pattern obtained by eliminating at least the period of the lower limit frequency from the periods included in the modulation pattern corresponding to the second state.

According to this aspect of the invention, the setting of the modulation pattern becomes easier.

A seventh aspect of the invention is directed to the driving device for a discharge lamp of the fifth aspect of the invention, wherein the modulation pattern corresponding to the first state is a modulation pattern obtained by setting the frequency of each period of the modulation pattern corresponding to the second state to be a predetermined value higher than before.

According also to this aspect of the invention, the setting of the modulation pattern becomes easier.

It should be noted that the invention can be put into practice in various forms. The invention can be put into practice in the forms of, for example, a driving device and a driving method of a discharge lamp, a light source device using a discharge lamp and the a control method thereof, and an image display apparatus using the light source device.

BRIEF DESCRIPTION OF THE DRAWINGS

The invention will now be described with reference to the accompanying drawings, wherein like numbers reference like elements.

DETAILED DESCRIPTION OF EMBODIMENTS

A1. Configuration of Projector

Figure 1:
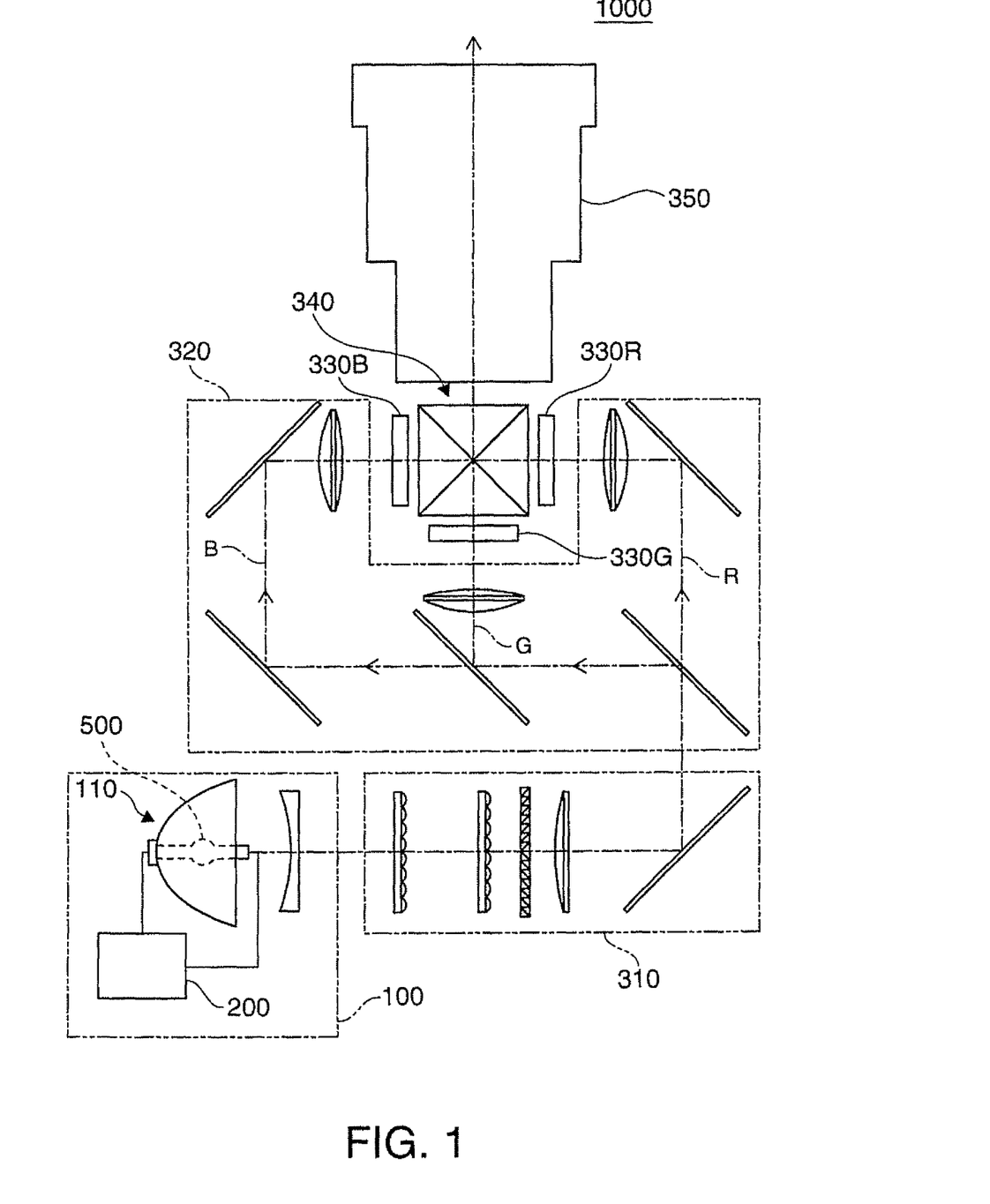
FIG. 1 is a schematic configuration diagram of a projector to which a first embodiment of the invention is applied.

FIG. 1 is a schematic configuration diagram of a projector 1000 to which a first embodiment of the invention is applied. The projector 1000 includes a light source device 100, an illumination optical system 310, a color separation optical system 320, three liquid crystal light valves 330R, 330G, 330B, a cross dichroic prism 340, and a projection optical system 350.

The light source device 100 has a light source unit 110 attached with a discharge lamp 500, and a discharge lamp driving device 200 for driving the discharge lamp 500. The discharge lamp 500 is supplied with electric power by the discharge lamp driving device 200 to emit light. The light source unit 110 emits the emitted light of the discharge lamp 500 toward the illumination optical system 310. It should be noted that specific configurations and specific functions of the light source unit 110 and the discharge lamp driving device 200 will be described later.

The illumination optical system 310 uniformizes the illuminance of the light emitted from the light source unit 110 and at the same time aligns the polarization direction thereof to one direction. The light with the illuminance uniformized through the illumination optical system 310 and with the polarization direction aligned therethrough is separated into three colored light beams of red (R), green (G), and blue (B) by the color separation optical system 320. The three colored light beams thus obtained by the color separation optical system 320 are modulated by the respective liquid crystal light valves 330R, 330G, 330B. The three colored light beams respectively modulated by the liquid crystal light valves 330R, 330G, 330B are then combined by the cross dichroic prism 340, and enter the projection optical system 350. By the projection optical system 350 projecting the light beams, which have entered, on a screen not shown, an image is displayed on the screen as a full color picture obtained by combining the images respectively modulated by the liquid crystal light valves 330R, 330G, 330B. It should be noted that although in the first embodiment, the three liquid crystal light valves 330R, 330G, 330B individually modulate the respective three colored light beams, it is also possible to assume that a single liquid crystal light valve provided with a color filter modulates the light beam. In this case, it becomes possible to eliminate the color separation optical system 320 and the cross dichroic prism 340.

A2. Configuration of Light Source Device

Figure 2:
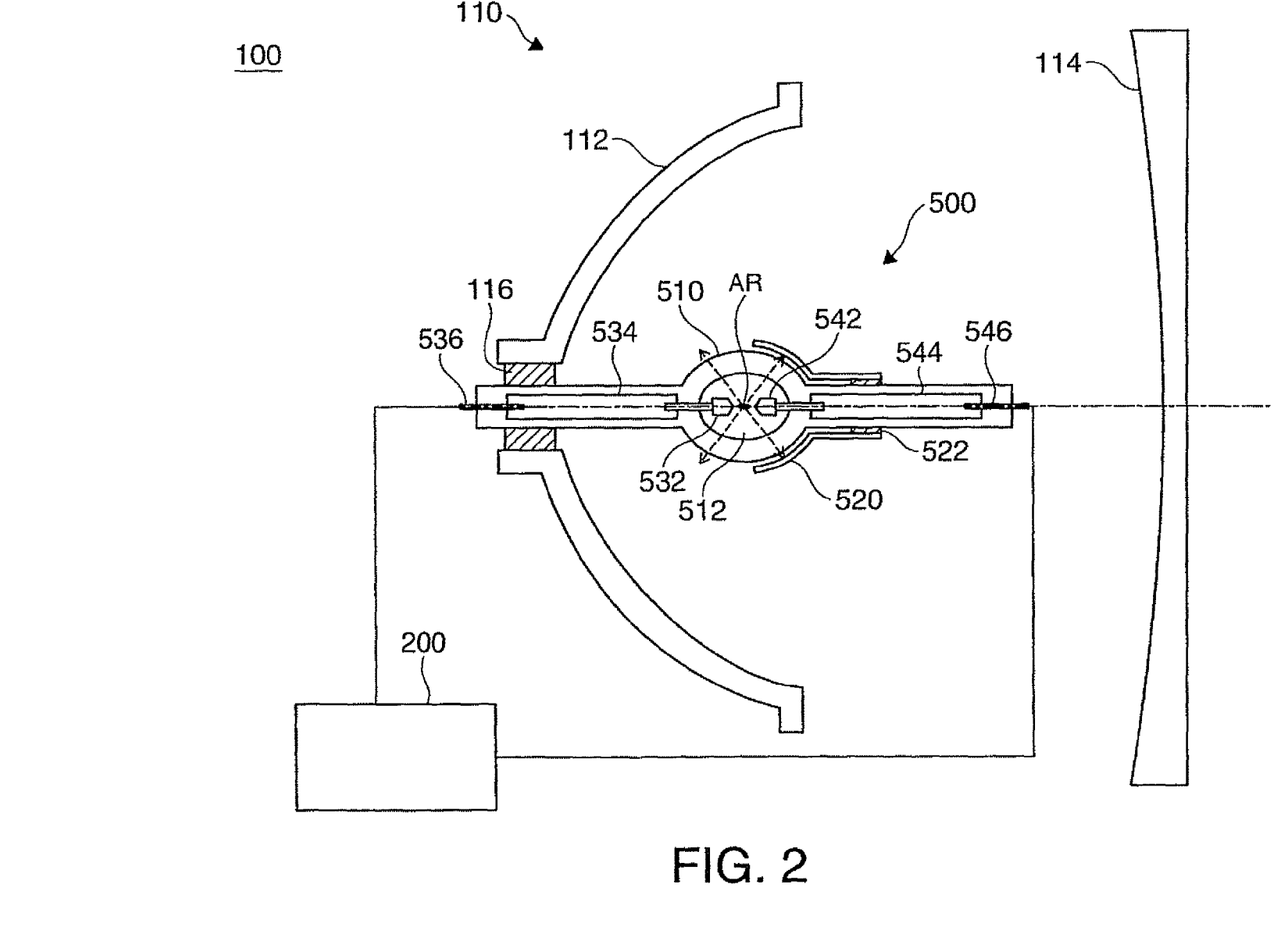
FIG. 2 is an explanatory diagram showing a configuration of a light source device.

FIG. 2 is an explanatory diagram showing a configuration of the light source device 100. As described above, the light source device 100 is provided with the light source unit 110 and the discharge lamp driving device 200. The light source unit 110 is provided with the discharge lamp 500, a primary reflecting mirror 112 having a spheroidal reflecting surface, and a collimating lens 114 for obtaining an approximately collimated light beam as the light beam emitted therefrom. It should be noted that the reflecting surface of the primary reflecting mirror 112 is not necessarily required to have a spheroidal shape. For example, the reflecting surface of the primary reflecting mirror 112 can be a paraboloid. In this case, by placing the light emitting section of the discharge lamp 500 at a so-called focal point of the paraboloidal mirror, the collimating lens 114 can be eliminated. The primary reflecting mirror 112 and the discharge lamp 500 are bonded to each other with an inorganic adhesive 116.

The discharge lamp 500 is formed by bonding a discharge lamp main body 510 and a secondary reflecting mirror 520 having a spheroidal reflecting surface to each other with an inorganic adhesive 522. The discharge lamp main body 510 is formed from, for example, a glass material such as quartz glass. The discharge lamp main body 510 is provided with two electrodes 532, 542 formed from a high-melting point metal electrode material such as tungsten, two connection members 534, 544, and two electrode terminals 536, 546. The electrodes 532, 542 are disposed so that the tip portions thereof are opposed to each other in a discharge space 512 formed at the center of the discharge lamp main body 510. In the discharge space 512, there is encapsulated a gas including a noble gas, mercury, a metallic halide, and so on as a discharge medium. The connection members 534, 544 are members for electrically connecting the electrodes 532, 542 and the electrode terminals 536, 546 to each other, respectively.

The electrode terminals 536, 546 of the discharge lamp 500 are separately connected to the discharge lamp driving device 200. The discharge lamp driving device 200 supplies the electrode terminals 536, 546 with a pulsed alternating current (an alternating pulse current). When the alternating pulse current is supplied to the electrode terminals 536, 546, an arc AR occurs between the tip portions of the two electrodes 532, 542 disposed in the discharge space 512. The arc AR emits light in all directions from the point where the arc AR occurs. The secondary reflecting mirror 520 reflects the light, which is emitted toward one electrode 542, toward the primary reflecting mirror 112. By thus reflecting the light, which is emitted toward the electrode 542, toward the primary reflecting mirror 112, a higher degree of parallelization of the light emitted from the light source unit 110 can be obtained. It should be noted that the electrode 542 on the side where the secondary reflecting mirror 520 is disposed is referred to also as a "secondary mirror side electrode 542," and the other electrode 532 is referred to also as a "primary mirror side electrode 532."

Figure 3:
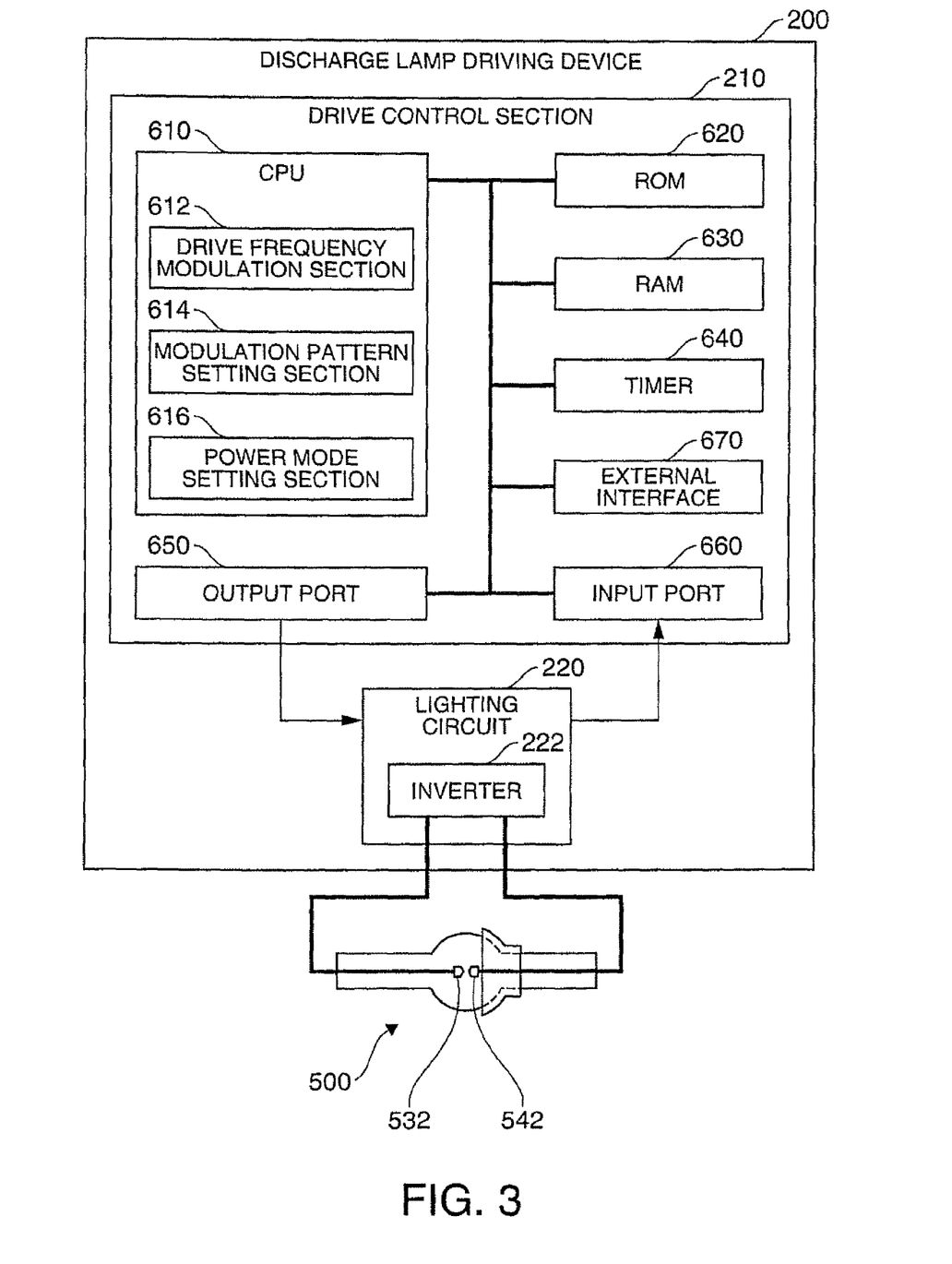
FIG. 3 is a block diagram showing a configuration of a discharge lamp driving device.

FIG. 3 is a block diagram showing a configuration of the discharge lamp driving device 200. The discharge lamp driving device 200 has a drive control section 210 and a lighting circuit 220. The drive control section 210 is configured as a computer provided with a CPU 610, a ROM 620, a RAM 630, a timer 640, an output port 650 for outputting a control signal to the lighting circuit 220, an input port 660 for acquiring a signal from the lighting circuit 220, and an external interface 670. The external interface 670 acquires an operation signal from an operation panel (not shown) provided to the projector 1000 or a receiving section (not shown) of the operation signal from a remote controller. The CPU 610 of the drive control section 210 executes a program stored in the ROM 620 based on output signals from the timer 640, the input port 660, and the external interface 670. Thus, the CPU 610 realizes functions as a drive frequency modulation section 612, a modulation pattern setting section 614, and a power mode setting section 616.

The lighting circuit 220 has an inverter 222 for generating an alternating pulse current. The lighting circuit 220 controls the inverter 222 based on the control signal supplied from the drive control section 210 via the output port 650. Specifically, the lighting circuit 220 makes the inverter 222 generate the alternating pulse current corresponding to feed conditions (e.g., a power value and a frequency of the alternating pulse current) designated by the control signal. In the first embodiment, in order for suppressing generation of a scroll noise due to a brightness variation, the alternating pulse current is made to have a rectangular waveform. The inverter 222 generates the alternating pulse current with predetermined power (e.g., 200 W or 150 W) corresponding to the power mode (described later) in accordance with the feed conditions designated by the lighting circuit 220, and supplies the discharge lamp 500 with the alternating pulse current thus generated. It should be noted that the voltage (the lamp voltage) between the two electrodes 532, 542 of the discharge lamp 500 becomes a roughly constant voltage independently of the value of the current supplied to the discharge lamp 500. Therefore, the power value corresponding to the power mode is realized by varying mainly the current value.

The power mode setting section 616 of the drive control section 210 switches the power value to be set to the lighting circuit 220 based on the operation signal supplied from the external interface 670. Specifically, the power mode setting section 616 performs setting of the power value so that the lighting circuit 220 operates in either one of the power modes, namely a rated power mode in which the electric power to be supplied from the lighting circuit 220 to the discharge lamp 500 is the rated power of the discharge lamp 500 and a low power mode in which the electric power lower than the rated power is supplied to the discharge lamp 500. The drive frequency modulation section 612 sets the frequency (the drive frequency) fd of the alternating pulse current, which the lighting circuit 220 outputs, in accordance with the modulation pattern set by the modulation pattern setting section 614. The modulation pattern setting section 614 sets the modulation pattern in accordance with the power mode of the lighting circuit 220 thus set by the power mode setting section 616.

A3. Drive of Discharge Lamp with Alternating Pulse Current

Figure 4A:
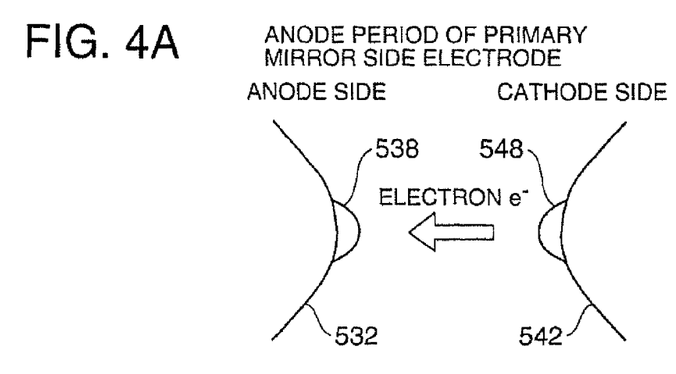
FIGS. 4A through 4C are explanatory diagrams showing how the arc is generated between the electrodes.
Figure 4B:
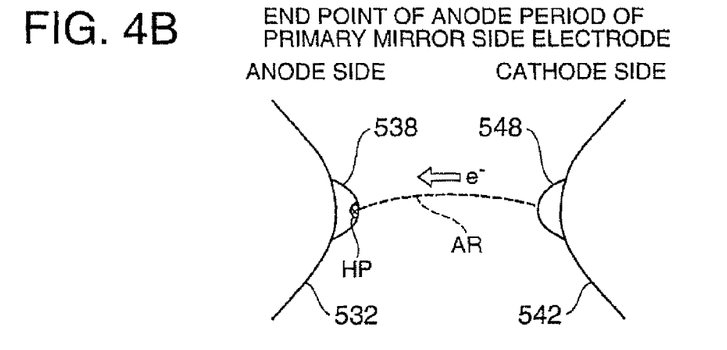
Figure 4C:
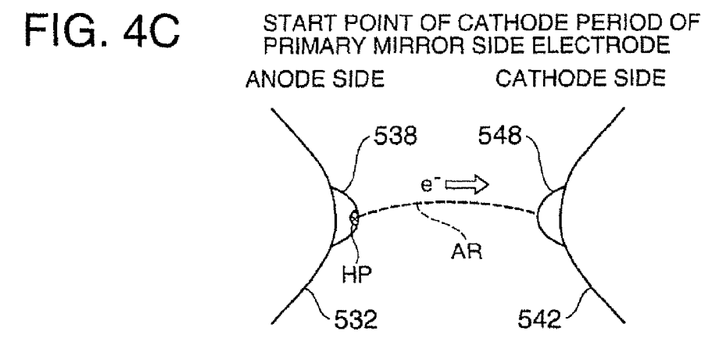

FIGS. 4A through 4C are explanatory diagrams showing how the arc occurs between the electrodes 532, 542 when driving the discharge lamp 500 with the alternating pulse current. As shown in FIGS. 4A through 4C, the two electrodes 532, 542 of the discharge lamp 500 are respectively provided with projections 538, 548 toward the opposed electrode.

FIG. 4A shows the state in which the primary mirror side electrode 532 acts as an anode. As shown in FIG. 4A, in the period (an anode period) during which the primary mirror side electrode 532 acts as the anode, electrons are emitted from the secondary mirror side electrode 542 and then collide against the primary mirror side electrode 532. In the primary mirror side electrode 532 acting as the anode, the kinetic energy of the electrons having collided is converted into heat energy, and then heat is generated. Meanwhile, in the secondary mirror side electrode 542 acting as a cathode, since no collision of the electrons occurs, and therefore heat is hardly generated. Therefore, in the anode period of the primary mirror side electrode 532, the temperature of the primary mirror side electrode 532 rises, and the temperature in the secondary mirror side electrode 542 drops due to thermal conduction, radiation, and so on. Similarly, in the period (a cathode period) during which the primary mirror side electrode 532 acts as the cathode, namely the anode period of the secondary mirror side electrode 542, the temperature of the secondary mirror side electrode 542 rises, and the temperature of the primary mirror side electrode 532 drops.

FIGS. 4B and 4C show the states of generating the arc AR before and after the primary mirror side electrode 532 is switched from the anode to the cathode. As described above, in the anode period of the primary mirror side electrode 532 the temperature of the primary mirror side electrode 532 rises. Therefore, as shown in FIG. 4B, at the end point of the anode period of the primary mirror side electrode 532, an area (a hot point) HP with the highest temperature is formed at the tip portion of the projection 538. Then, when the primary mirror side electrode 532 is switched to the cathode, the electrons are emitted from the primary mirror side electrode 532 and reach the secondary mirror side electrode 542. In general, if the electric field applied to the electrons is approximately the same, the electrons are emitted from an area with higher temperature. Therefore, the electrons are emitted from the hot point HP of the primary mirror side electrode 532, where the temperature is the highest at the end point of the anode period. It should be noted that such electrons emitted from the place with high temperature is called "thermal electron."

When reducing the power of the alternating pulse current supplied to the discharge lamp 500, the temperature in the hot point HP drops. Since the electrons are emitted from the hot point HP of the electrode in the cathode state, if the temperature at the hot point HP drops, the emission point of the electrons becomes apt to migrate, and a variation (a flicker) of the point where the arc AR occurs might be caused. Therefore, in the first embodiment, in order for preventing the flicker (also called an "arc jump") from occurring, modulation of the drive frequency fd of the alternating pulse current is executed with the modulation pattern corresponding to the power mode.

A4. Drive Frequency Modulation for Discharge Lamp

Figure 5A:
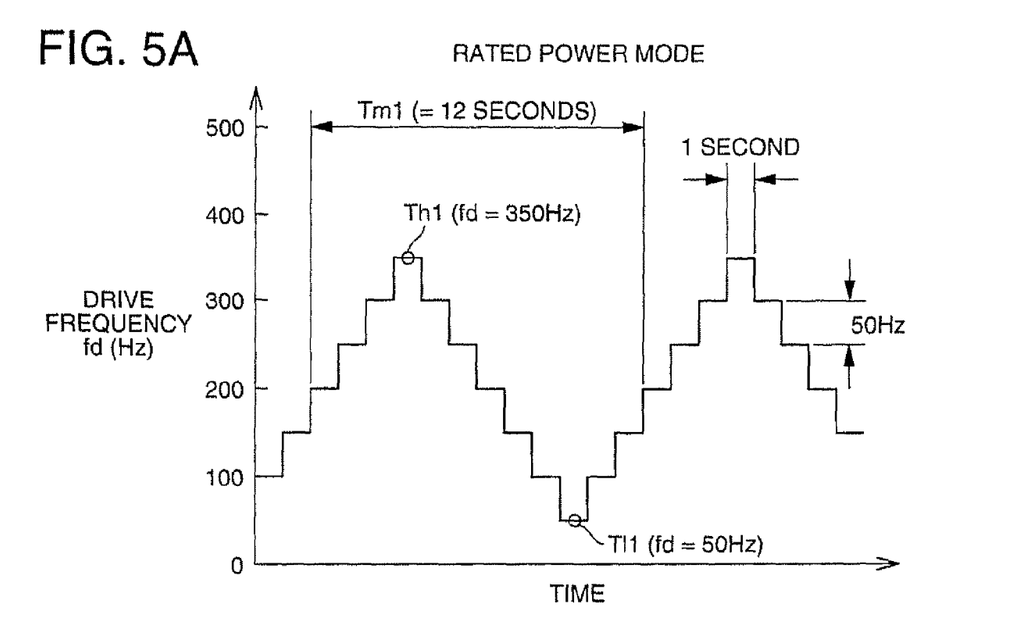
FIGS. 5A and 5B are explanatory diagrams showing an example of modulation patterns of a drive frequency according to the first embodiment.
Figure 5B:
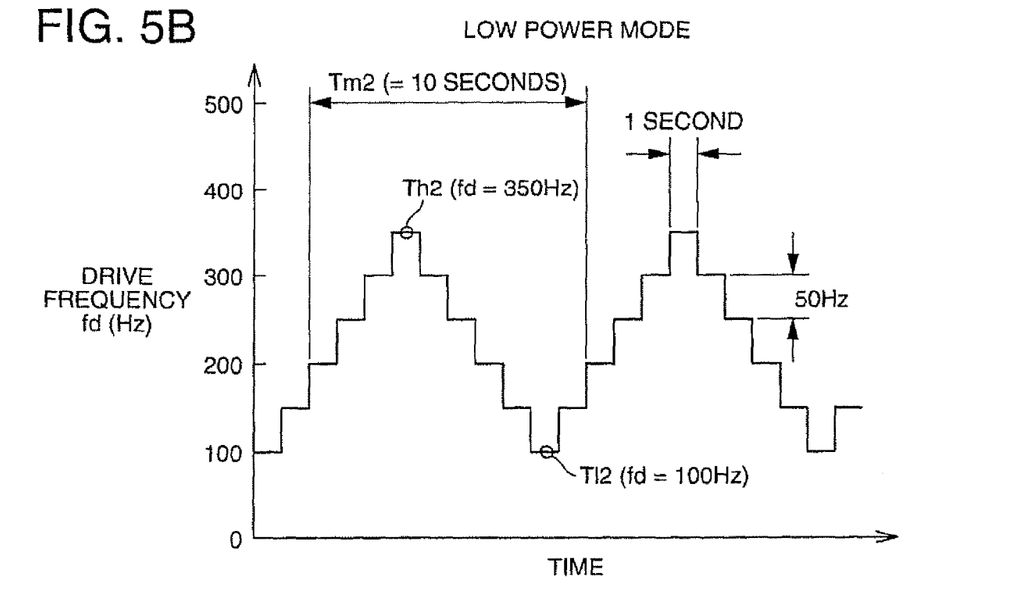

FIGS. 5A and 5B are explanatory diagrams showing an example of modulation patterns of the drive frequency fd set by the modulation pattern setting section 614. FIG. 5A shows a modulation pattern in the state (hereinafter referred to simply as a "rated power mode") in which the lighting circuit 220 is set in the rated power mode, and FIG. 5B shows a modulation pattern in the state (hereinafter referred to simply as a "low power mode") in which the lighting circuit 220 is set in the low power mode. In the two graphs shown in FIGS. 5A and 5B, the lateral axis represents time, and the vertical axis represents the drive frequency fd.

As shown in FIG. 5A, in the rated power mode, the drive frequency fd is modulated with a modulation period Tm1 (12 seconds). The modulation of the drive frequency fd is performed by varying the frequency by 50 Hz every 1 second. Thus, the drive frequency fd is modulated in a range from the period (the lowest frequency period) Tl1 of 50 Hz, in which the drive frequency fd is the lowest, to the period (the highest frequency period) Th1 of 350 Hz, in which the drive frequency fd is the highest.

On the other hand, as shown in FIG. 5B, the modulation pattern in the low power mode corresponds to the pattern obtained by eliminating the drive period (i.e., the lowest frequency period Tl1) at 50 Hz and the previous (or the subsequent) drive period at 100 Hz from the modulation period Tm1 of the modulation pattern in the rated power mode shown in FIG. 5A. Therefore, the modulation period Tm2 of the drive frequency fd is set to be 10 seconds, which is shorter than the modulation period Tm1 in the rated power mode, and the drive frequency fd is modulated in a range from the lowest frequency period Tl2 of 100 Hz to the highest frequency period Th2 of 350 Hz. It should be noted that although in the example shown in FIG. 5B, the drive period at 100 Hz is also eliminated together with the lowest frequency period Tl1 so that each of the periods having constant frequencies becomes 1 second, it is also possible to eliminate only the lowest frequency period Tl1. In general, the modulation pattern in the low power mode is only required to be obtained by eliminating at least the lowest frequency period Tl1 from the modulation pattern in the rated power mode.

As described above, in the first embodiment, the drive period at 50 Hz as the lowest frequency period Tl1 of the modulation pattern in the rated power mode is eliminated from the modulation period Tm1. Therefore, the drive frequency fd (100 Hz) of the lowest frequency period Tl2 in the low power mode is set to be higher than the drive frequency fd (50 Hz) of the lowest frequency period Tl1 in the rated power mode, and the drive frequency fd is commonly set to be 350 Hz in both of the highest frequency periods Th1, Th2.

It should be noted that although in the first embodiment, the pattern obtained by eliminating the lowest frequency period Tl1 from the modulation pattern of the rated power mode as the modulation pattern of the low power mode, the period to be eliminated from the modulation pattern of the rated power mode is not necessarily limited to the lowest frequency period Tl1. In general, as the modulation pattern of the low power mode, a pattern obtained by eliminating the period with the drive frequency fd lower than a predetermined value from the modulation pattern of the rated power mode can be used. Thus, the lowest value of the drive frequency fd in the low power mode is set to be higher than the lowest value of the drive frequency fd in the rated power mode.

A5. Arc Generation Condition

Figure 6A:
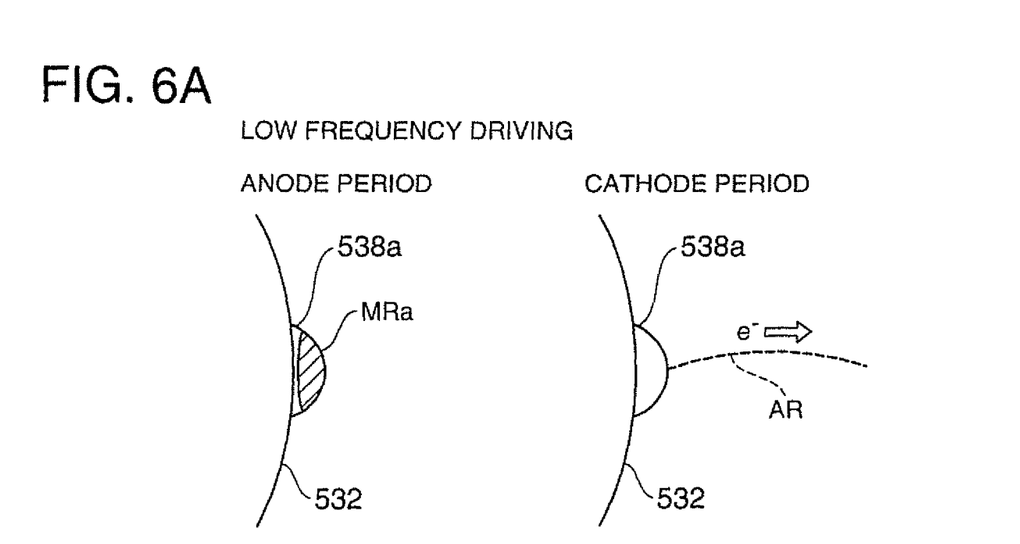
FIGS. 6A and 6B are explanatory diagrams showing an influence exerted by power modes and the modulation patterns on a generation condition of the arc.
Figure 6B:
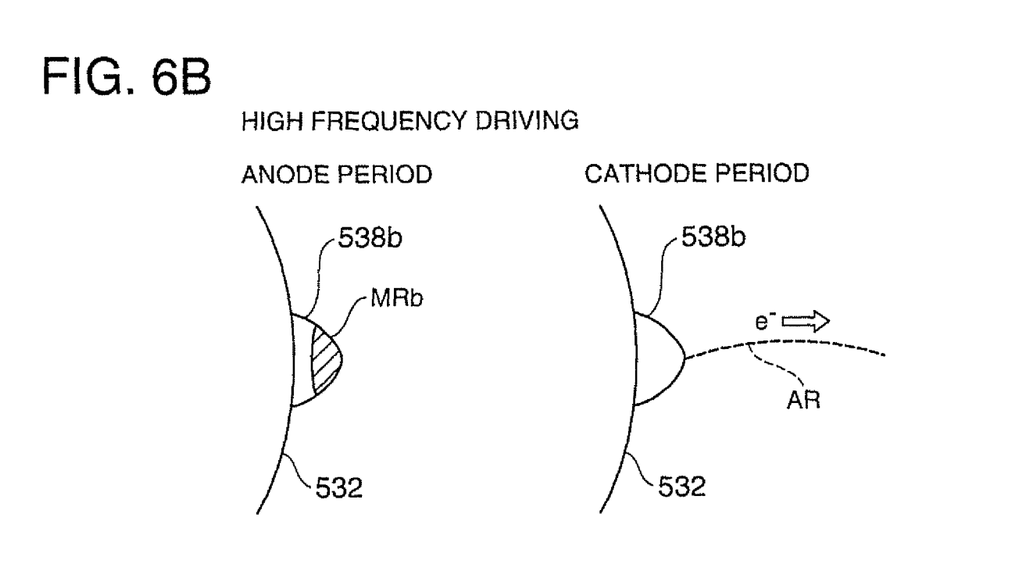
Figure 7A:
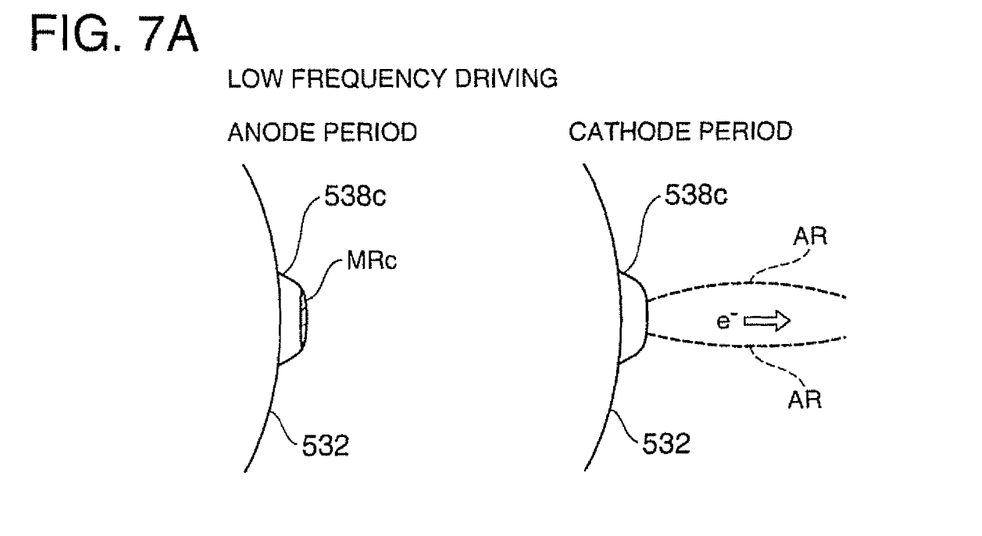
FIGS. 7A and 7B are explanatory diagrams showing an influence exerted by the power modes and the modulation patterns on the generation condition of the arc.
Figure 7B:
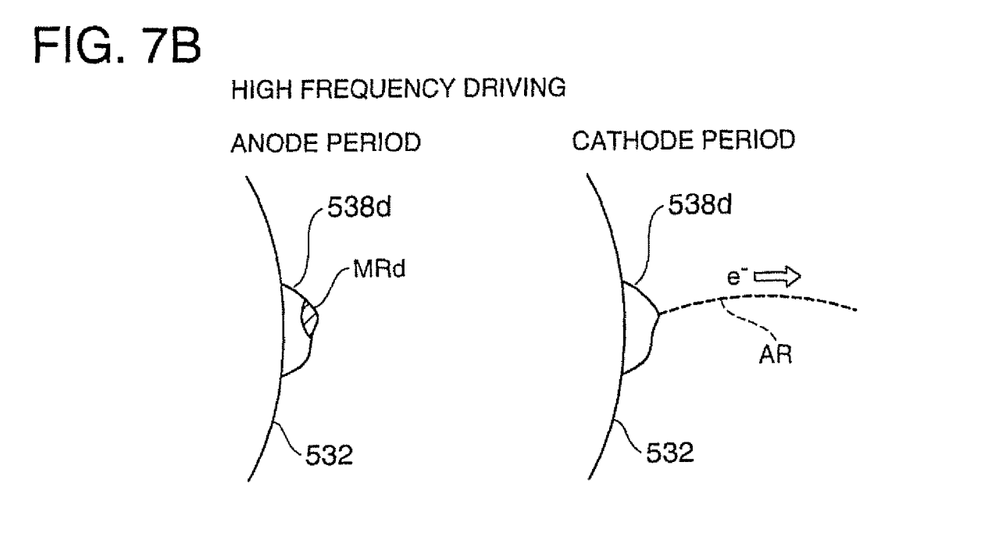

FIGS. 6A, 6B, 7A, and 7B are explanatory diagrams showing an influence exerted on the generation condition of the arc by the power modes and the modulation patterns. FIGS. 6A and 6B show an influence exerted on the shape of the primary mirror side electrode 532 and the generation condition of the arc AR by the difference in drive frequency fd in the rated power mode. FIGS. 7A and 7B show an influence exerted on the shape of the primary mirror side electrode 532 by the modulation of the drive frequency fd in the low power mode. It should be noted that since the influence of the power mode and the modulation pattern on the shape of the secondary mirror side electrode 542 is substantially the same as that on the primary mirror side electrode 532, the explanations thereof will be omitted.

As described above, in the anode period of the primary mirror side electrode 532 the temperature of the primary mirror side electrode 532 rises. Therefore, a melted portion where the electrode material is melted appears in the projection 538 (FIGS. 4A through 4C) of the primary mirror side electrode 532. Further, when the polarity of the primary mirror side electrode 532 is switched from the anode to the cathode, the temperature of the primary mirror side electrode 532 drops, and solidification of the melted portion appeared in the tip portion of the projection 538 begins. By the melted portion thus appearing in the projection 538 and then being solidified, the projection 538 is maintained to have the shape convex toward the opposed electrode. It should be noted that hereinafter when distinguishing the projections 538 with different shapes corresponding to the power mode and the level of the drive frequency fd, subscripts a through d are attached to the reference symbols.

As shown in FIG. 6A, when the drive frequency fd is low, temperature rise occurs in a large area of the projection 538a of the primary mirror side electrode 532 in the anode state. Further, when the drive frequency fd is low, the force applied to the melted portion MRa due to the potential difference from the secondary mirror side electrode 542 opposed thereto (FIGS. 4A through 4C) is also applied to a large area of the melted section MRa. Therefore, as shown in FIG. 6A, a flat melted portion MRa is formed in the projection 538a of the primary mirror side electrode 532. Then, when the primary mirror side electrode 532 is switched to the cathode, the melted portion MRa is solidified to form the projection 538a with a flat shape. The flat projection 538a forms a spherical shape due to the surface tension of the melted portion MRa not yet solidified. As described above, since the projection 538a has a spherical shape, the arc AR starts appearing from the position nearest to the secondary mirror side electrode 542. Therefore, the position on the primary mirror side electrode 532 from which the arc AR occurs is stabilized.

Meanwhile, as shown in FIG. 6B, when the drive frequency fd is high, the area in the projection 538b of the primary mirror side electrode 532 in the anode state where the temperature rise occurs becomes smaller. Further, the force applied to the melted portion MRb of the projection 538b is concentrated to the center of the melted portion MRb. Therefore, as shown in FIG. 6B, the shape of the melted portion MRb formed in the projection 538b is elongated, and the shape of the projection 538b after the melted portion MRb is solidified is elongated. Therefore, the arc AR stably occurs from the tip of the projection 538b formed to have an elongated shape.

Further, in the rated power mode, since the projection 538a is sufficiently melted in the low frequency drive with the low drive frequency fd, growth of a thick projection 538a is promoted. Further, in the high frequency drive with the high drive frequency fd, growth of the projection 538b toward the opposed electrode is promoted. Therefore, by modulating the drive frequency fd to form a large projection 538a in the low frequency drive and an elongated projection 538b in the high frequency drive, the projection 538 has a shape such as a conical shape for stabilizing the position at which the arc occurs.

In contrast, in the low power mode, since the current flowing between the electrodes 532, 542 becomes smaller, the heating value in the projection 538 is reduced, and the temperature of the electrodes 532, 542 in the anode period becomes lower than in the rated power mode.

As shown in FIG. 7A, when the drive frequency fd is low, since the heated portion is dispersed in a large area of the projection 538c, the melted portion MRc is formed only on the surface of the projection 538c near to the secondary mirror side electrode 542. As described above, in the low power mode, since the projection 538c is not sufficiently melted, the spherical projection 538a (FIG. 6A) as in the rated power mode is not formed, and planarization of the tip of the projection 538c progresses. Then, when the tip of the projection 538c is planarized, the arc AR is formed at a random position of the projection 538c thus planarized, and the flicker is caused.

Meanwhile, as shown in FIG. 7B, when the drive frequency fd is high, since the heated portion is concentrated in a small area, the temperature around a part of the planarized projection 538d at which the arc AR occurs rises, and an elongated melted portion MRd is formed at a position the arc AR once occurs. Then, the arc AR stably occurs from the tip of the elongated projection 538d formed by the solidification of the melted portion MRd.

In the first embodiment, the drive frequency fd is modulated using the pattern obtained by eliminating the lowest frequency period Tl1 from the modulation pattern of the rated power mode as the modulation pattern of the low power mode. As described above, by setting the lowest value (lower limit frequency) of the drive frequency fd in the low power mode to be higher than the lowest value of the drive frequency fd in the rated power mode, it is possible to prevent the heated portion from dispersing into the entire projection 538 in the low power mode in which the heating value in the anode period is small. Thus, since the planarization of the projection 538 is prevented, it becomes possible to prevent the flicker from occurring in the low power mode.

B. Second Embodiment

Figure 8A:
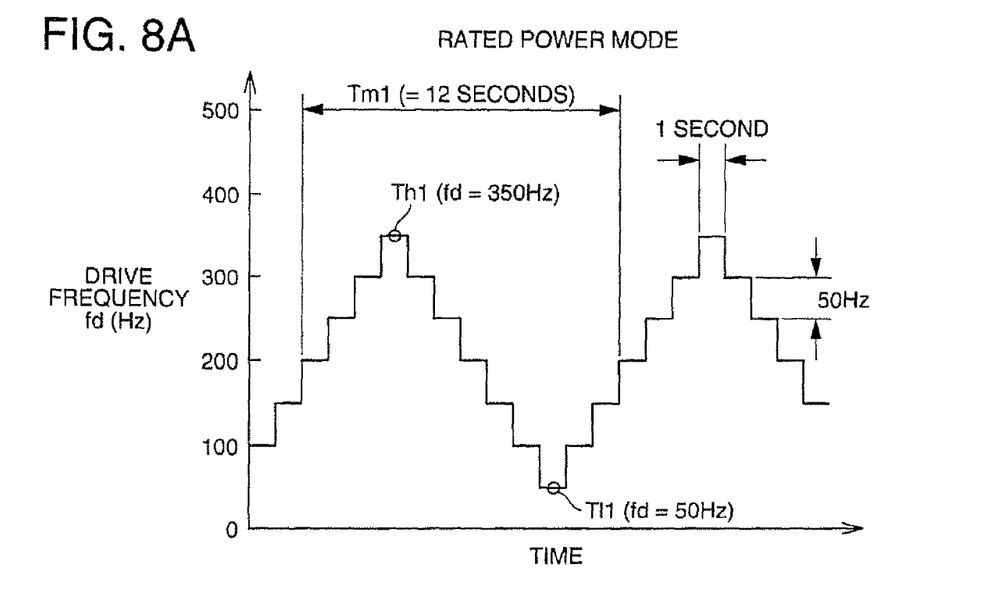
FIGS. 8A and 8B are explanatory diagrams showing an example of modulation patterns of a drive frequency according to a second embodiment.
Figure 8B:
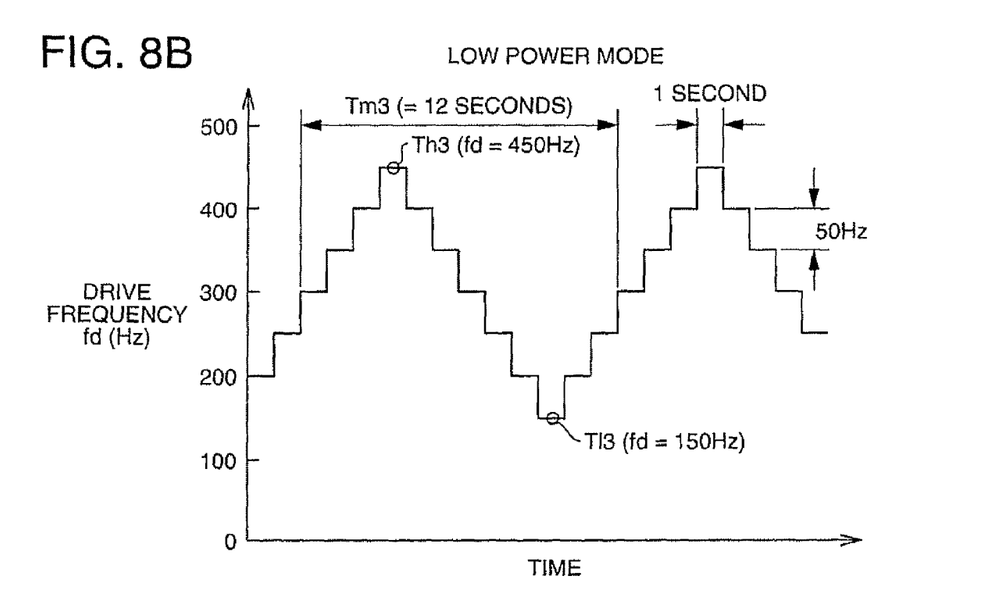

FIGS. 8A and 8B are explanatory diagrams showing an example of modulation patterns of the drive frequency fd set by the modulation pattern setting section 614 in the second embodiment. FIG. 8A shows the modulation pattern in the rated power mode, and FIG. 8B shows the modulation pattern in the low power mode. The modulation pattern in the rated power mode in the second embodiment shown in FIG. 8A is the same as in the first embodiment shown in FIG. 5A.

As shown in FIG. 8B, in the second embodiment, the modulation period Tm3 of the drive frequency fd is set to be the same as the modulation period Tm1 of the rated power mode. Further, the drive frequency fd in each period in the modulation period Tm3 is set to be 100 Hz higher than in the rated power mode. Thus, in the low power mode, the drive frequency fd is modulated in a range from the lowest frequency period Tl3 of 150 Hz to the highest frequency period Th3 of 450 Hz.

As described above, in the second embodiment, by setting the drive frequency fd to be 100 Hz higher in each period, the lowest value of the drive frequency fd in the low power mode is set to be higher than the lowest value of the drive frequency fd in the rated power mode. Therefore, it becomes possible to prevent the flicker from occurring in the low power mode similarly to the case of the first embodiment. Further, in the second embodiment, the highest value (the upper limit frequency) of the drive frequency fd in the low power mode is set to be higher in the rated power mode. Therefore, since the formation of the elongated projection 538d (FIG. 7B) is further promoted to stabilize the position at which the arc AR occurs, the flicker is further prevented from occurring.

C. Third Embodiment

Figure 9:
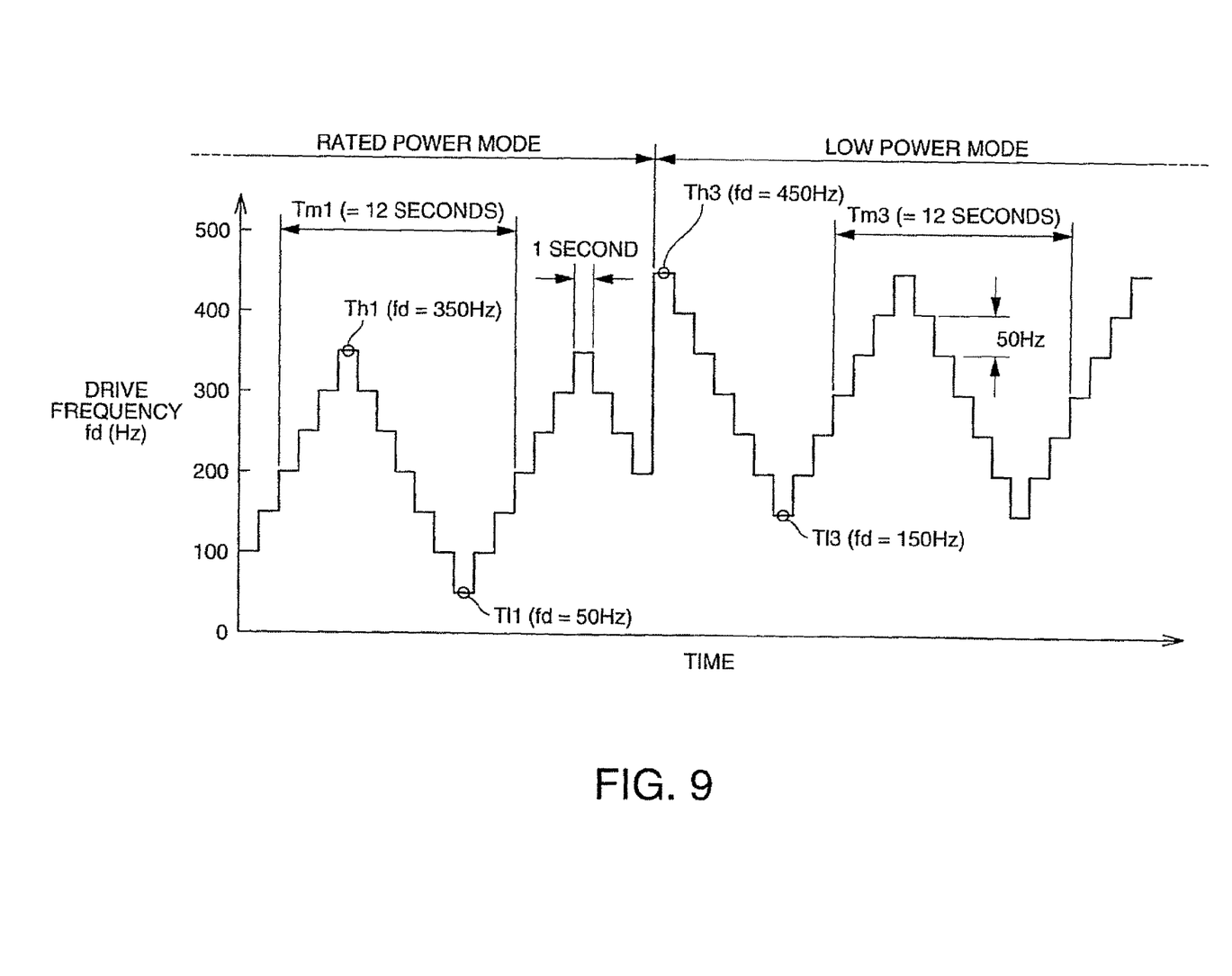
FIG. 9 is an explanatory diagram showing an example of a modulation pattern of a drive frequency according to a third embodiment.

FIG. 9 is an explanatory diagram showing an example of the modulation pattern of the drive frequency fd in the case in which the power mode is switched from the rated power mode to the low power mode in the third embodiment. As shown in FIG. 9, in the third embodiment, after the power mode is switched from the rated power mode to the low power mode, the drive frequency fd is set in the highest state. It should be noted that since the modulation pattern in the rated power mode and the modulation pattern in the low power mode are the same as in the second embodiment, the explanations therefor will be omitted here.

As described above, in the rated power mode, the temperature in the projections 538, 548 (FIGS. 4A through 4C) becomes sufficiently high. Therefore, the temperature of the projections 538, 548 immediately after the power mode is transferred from the rated power mode to the low power mode is higher than the steady temperature of the projections 538, 548 when driving them in the low power mode. In such a condition in which the temperature of the projections 538, 548 is relatively high immediately after the power mode is transferred to the low power mode, the projections 538, 548 are easily melted. By setting the drive frequency fd to be higher in such a condition, the projections 538, 548 are sufficiently melted and the growth of the elongated projection 538d (FIG. 7B) stabilizing the position at which the arc occurs is further promoted.

As described above, in the third embodiment, when the power mode is switched from the rated power mode to the low power mode, the drive frequency fd is set to be higher immediately after the switching, thereby promoting the growth of the elongated projection 538d capable of stabilizing the position at which the arc occurs. Therefore, it becomes possible to further prevent the flicker from occurring.

It should be noted that although in the third embodiment, the drive frequency fd in the early stage of the low power mode after the power mode is switched from the rated power mode to the low power mode is set to be the highest frequency (450 Hz) in the low power mode, the drive frequency fd in the early stage is not necessarily required to set to be the highest frequency. In general, it is only required for the drive frequency fd in the early stage of the low power mode to be higher than the lowest frequency. According also to this process, since the formation of the elongated projection 538d corresponding to the drive frequency fd in the early stage is promoted and the position at which the arc AR occurs can be stabilized, it is possible to prevent the flicker from occurring.

D. Modified Examples

It should be noted that the invention is not limited to the embodiments or the specific examples described above, but can be put into practice in various forms within the scope or the spirit of the invention, and the following modifications, for example, are also possible.

D1. Modified Example 1

Although in each of the embodiments described above, the lowest frequency in the low power mode in which the flicker is apt to occur is set to be higher than the lowest frequency in the rated power mode, if the flicker occurs not only in the low power mode but also under the conditions in which the flicker is apt to occur in general, the position of the arc migrates, and the heat generation is dispersed into the entire projection, thus the planarization of the tip of the projection progresses. Therefore, by setting the lowest frequency in the condition in which the flicker is more apt to occur than in a specific condition to be higher than the lowest frequency in the specific condition, the planarization of the projection caused due to the fact that the drive frequency fd is low can be prevented, and it becomes possible to prevent the flicker from occurring in the condition in which the flicker is apt to occur.

Figure 10:
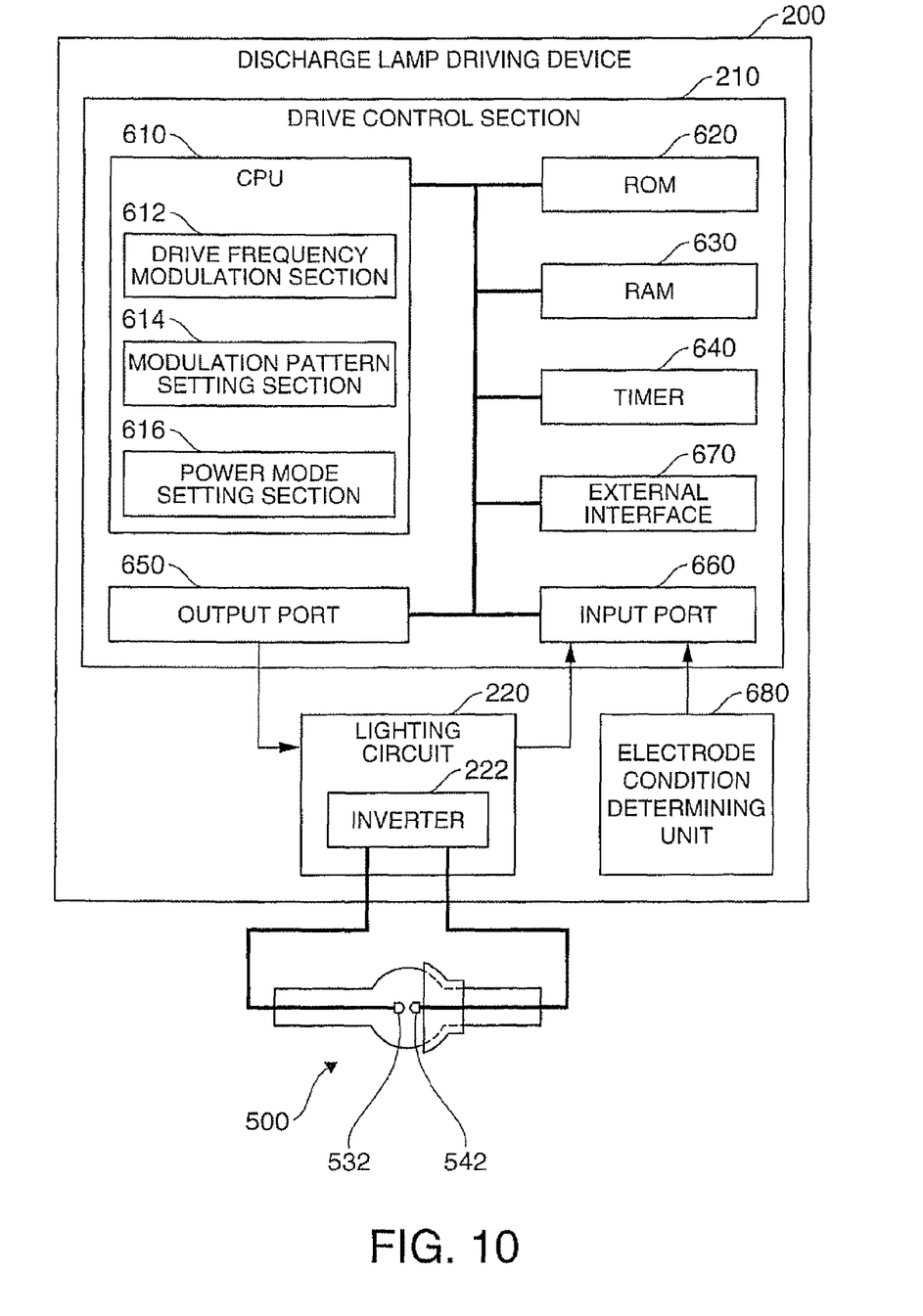
FIG. 10 is a block diagram showing a configuration of a discharge lamp driving device according to a Modified Example 1.
Figure 11:
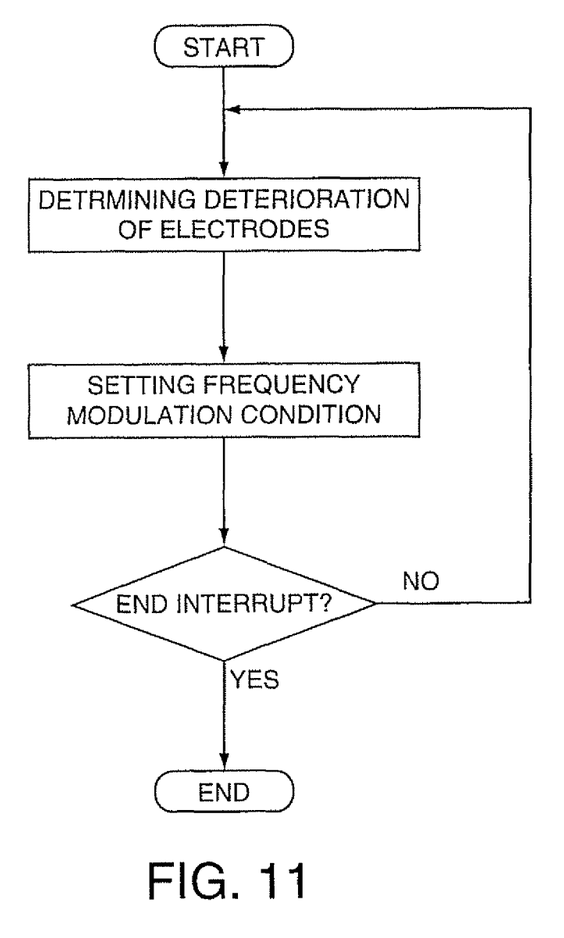
FIG. 11 is a flowchart showing a driving method executed by the driving device of a modified example 1.

Specifically, it is also possible to set the lowest frequency in the condition in which it is determined that the deterioration of the discharge lamp 500 has progressed to be higher than the lowest frequency in the condition in which it is determined that the deterioration of the discharge lamp 500 has not progressed. For example, the discharge lamp driving device 200 can include an electrode condition determining unit 680 that determines that the deterioration of the discharge lamp 500 has progressed when a detected electrode parameter exceeds a predetermined value, which is preliminarily defined as the threshold deterioration, as shown in FIG. 10. A driving method for a discharge lamp according to this Modified Example 1 is shown in FIG. 11. In general, the deterioration of the discharge lamp 500 progresses in accordance with the consumption of the electrodes 532, 542 by evaporation. In the case in which the electrodes 532, 542 have been exhausted, the tips of the electrodes 532, 542 get rough, and there is a high possibility of generating the arc AR at random positions on the roughened electrode surface. Therefore, by setting the lowest frequency to be higher in the case in which it is determined that the deterioration of the discharge lamp 500 has progressed, it is prevented that the arc AR occurs at a random position due to the low frequency drive, and therefore, it becomes possible to prevent the flicker from occurring.

It should be noted that whether or not the deterioration of the discharge lamp 500 has progressed can be determined based on, for example, the lamp voltage, namely the voltage between the electrodes 532, 542. In general, the lamp voltage rises in accordance with the consumption of the electrodes 532, 542. Therefore, it is also possible to configure the lighting circuit 220 (FIG. 10) so as to be able to detect the lamp voltage, determine that the deterioration of the discharge lamp 500 has progressed when the detected lamp voltage exceeds a predetermined voltage as the threshold deterioration, and set the lowest frequency to be higher. Further, it is also possible to determine whether or not the deterioration of the discharge lamp 500 has progressed based on, for example, actual generation of the flickers and the reduction of the light intensity due to the evaporation of the electrode material on the inside wall surrounding the discharge space 512 (FIG. 2). The generation of the flickers and the reduction of the light intensity can be detected using an optical sensor such as a photodiode disposed close to the discharge lamp 500. Further, it is also possible to determine whether or not the deterioration has progressed based on the cumulative lighting time of the discharge lamp 500.

D2. Modified Example 2

Although in each of the embodiments the modulation of the drive frequency fd is executed along the modulation pattern having a plurality of periods with the drive frequency fd different from each other, the form of the modulation of the drive frequency fd is not necessarily limited thereto. The modulation range of the drive frequency fd, the period during which the drive frequency fd is kept constant, the amount of variation of the drive frequency fd, and so on can appropriately be varied in accordance with, for example, the characteristic of the discharge lamp 500. Further, it is also possible to continuously vary the drive frequency fd. According also to the configuration described above, it is possible to prevent the flicker from occurring by setting the lowest frequency in the low power mode to be higher than the lowest frequency in the rated power mode. It should be noted that since the formation of the projections 538, 548 can more stably be performed, it is preferable to keep the predetermined drive frequency fd constant for a predetermined period of time. More preferably, there is provided a plurality of periods with the drive frequency fd different from each other. Thus, the projections 538, 548 corresponding to the respective drive frequencies fd can stably be formed. Further, in order for enhancing the effect of the modulation of the drive frequency fd, it is preferable to modulate the drive frequency fd along the modulation pattern including the lowest frequency period Tl1 through Tl3 longer than at least a predetermined period of time and the highest frequency period Th1 through Th3.

D3. Modified Example 3

Although in each of the embodiments described above the liquid crystal light valves 330R, 330G, 330B are used as the light modulation sections in the projector 1000 (FIG. 1), it is also possible to use other arbitrary modulation sections such as digital micromirror devices (DMD, a trademark of Texas Instruments) as the light modulation sections. Further, the invention can also be applied to various types of image display devices, exposure devices, illumination devices, and so on including the liquid crystal display devices as long as the devices use the discharge lamp as the light source.

What is claimed is:

1. A driving device for a discharge lamp comprising:
an alternating current supply section adapted to supply two electrodes of the discharge lamp with an alternating current;
a frequency modulation section adapted to modulate a frequency of the alternating current along a modulation pattern including a plurality of periods with frequencies different from each other in which the frequency varies with time in a step-like manner in each of a rated power mode and a lower power mode in accordance with a predetermined condition of the discharge lamp within a range between a predetermined upper limit frequency and a predetermined lower limit frequency;
a modulation condition setting section adapted to set a modulation condition of the frequency modulated by the frequency modulation section; and
a power mode setting section adapted to set a power value supplied to the discharge lamp so that a RMS power supplied to the discharge lamp in the lower power mode is lower than a RMS power supplied to the discharge lamp in the rated power mode,
the modulation condition setting section adapted to set, in accordance with the lower power and the rated power mode, modulation patterns corresponding respectively to the lower power mode and the rated power mode in the frequency modulation section so that the lower limit frequency when the discharge lamp is in the lower power mode is higher than the lower limit frequency when the discharge lamp is in the rated power mode.

2. The driving device according to claim 1, the modulation condition setting section setting the modulation condition so that the upper limit frequency when the discharge lamp is in the lower power mode is higher than the upper limit frequency when the discharge lamp is in the rated power mode.

3. The driving device according to claim 1, RMS power of the alternating current in the lower power mode being lower than RMS power of the alternating current in the rated power mode.

4. The driving device for a discharge lamp according to claim 3, the frequency being set to a higher than a predetermined frequency in an early stage in the lower power mode after the discharge lamp is switched from the rated power mode to the lower power mode.

5. A driving method for a discharge lamp comprising:
modulating a frequency of an alternating current supplied to two electrodes of the discharge lamp along a modulation pattern including a plurality of periods with frequencies different from each other in which the frequency varies with time in a step-like manner in each of a rated power mode and a lower power mode in accordance with predetermined states of the discharge lamp within a range between a predetermined upper limit frequency and a predetermined lower limit frequency; and
setting, in accordance with the lower power and the rated power mode, modulation patterns corresponding respectively to the lower power mode and the rated power mode so that the lower limit frequency when the discharge lamp is in the lower power mode is higher than the lower limit frequency when the discharge lamp is in the rated power mode in which a RMS power supplied to the discharge lamp is higher than a RMS power supplied to the discharge lamp in the lower power mode.

6. A light source device comprising:
a discharge lamp; and
the driving device according to claim 1.

7. The light source device according to claim 6, the modulation condition setting section setting the modulation condition so that the upper limit frequency when the discharge lamp is in the lower power mode is higher than the upper limit frequency when the discharge lamp is in the rated power mode.

8. An image display apparatus comprising:
a discharge lamp as a light source adapted to display an image; and
the driving device according to claim 1.

9. The image display apparatus according to claim 8, the modulation condition setting section setting the modulation condition so that the upper limit frequency when the discharge lamp is in the lower power mode is higher than the upper limit frequency when the discharge lamp is in the rated power mode.

10. A driving device for a discharge lamp comprising:
an alternating current supply section adapted to supply two electrodes of the discharge lamp with an alternating current;
a frequency modulation section adapted to modulate a frequency of the alternating current along a modulation pattern including a plurality of periods with frequencies different from each other in which the frequency varies with time in a step-like manner in each of a first and second state in accordance with a predetermined condition of the discharge lamp within a range between a predetermined upper limit frequency and a predetermined lower limit frequency; and
a modulation condition setting section adapted to set a modulation condition of the frequency modulated by the frequency modulation section,
the modulation condition setting section adapted to set, in accordance with the first state and the second state, modulation patterns corresponding respectively to the first state and the second state in the frequency modulation section so that the lower limit frequency when the discharge lamp is in the first state is higher than the lower limit frequency when the discharge lamp is in the second state in which a RMS power of the alternating current is higher than in the first state.

11. The driving device according to claim 10, the modulation condition setting section setting the modulation condition so that the upper limit frequency when the discharge lamp is in the first state is higher than the upper limit frequency when the discharge lamp is in the second state.

12. A light source device comprising:
a discharge lamp; and
the driving device according to claim 10.

13. An image display apparatus comprising:
a discharge lamp as a light source adapted to display an image; and the driving device according to claim 10.

14. A driving method for a discharge lamp comprising:

modulating a frequency of an alternating current supplied to two electrodes of the discharge lamp along a modulation pattern including a plurality of periods with frequencies different from each other in which the frequency varies with time in a step-like manner in each of a first state and a second state in accordance with predetermined states of the discharge lamp within a range between a predetermined upper limit frequency and a predetermined lower limit frequency; and setting, in accordance with the first state and the second state, modulation patterns corresponding respectively to the first state and the second state so that the lower limit frequency when the discharge lamp is in the first state is higher than the lower limit frequency when the discharge lamp is in the second state in which a RMS power of the alternating current is higher than in the first state.

15. A driving device for a discharge lamp comprising:

an alternating current supply section adapted to supply two electrodes of the discharge lamp with an alternating current;

an electrode condition determining unit, which is separate from the discharge lamp, that determines that the deterioration of the two electrodes has exceeded: (1) if a voltage between the two electrodes has exceeded a predetermined voltage, (2) if the generation of a flicker in the discharge lamp has detected by an optical sensor, (3) if a reduction of the light intensity of the discharge lamp has detected by an optical sensor, or (4) based on a cumulative lighting time of the discharge lamp;

a frequency modulation section adapted to modulate a frequency of the alternating current along a modulation pattern including a plurality of periods with frequencies different from each other in which the frequency varies with time in a step-like manner within a range between a predetermined upper limit frequency and a predetermined lower limit frequency; and a modulation condition setting section adapted to set, in accordance with a first state and a second state, modulation patterns corresponding respectively to the first state and the second state in the frequency modulation section so that the lower limit frequency in the first state in which the electrode condition determining unit determines that the deterioration of the two electrodes has exceeded a first value, and to set the lower limit frequency in the second state in which the electrode condition determining unit that determines that the deterioration of the two electrodes has not exceeded a second value, the first value being higher than the second value.

16. The driving device according to claim 15, the modulation condition setting section setting the upper limit frequency when the discharge lamp is in the first state to a value higher than the upper limit frequency when the discharge lamp is in the second state.

17. The driving device according to claim 15, the electrode condition determining unit determining the electrode parameter based on a voltage between the two electrodes.

18. The driving device according to claim 15, the electrode condition determining unit determining the electrode parameter based on a cumulative lighting time of the discharge lamp.

19. A light source device comprising:

a discharge lamp; and the driving device according to claim 15.

20. An image display apparatus comprising:

a discharge lamp as a light source adapted to display an image; and the driving device according to claim 15.

21. A driving method for a discharge lamp comprising:

modulating a frequency of an alternating current supplied to two electrodes of the discharge lamp along a modulation pattern including a plurality of periods with frequencies different from each other in which the frequency varies with time in a step-like manner in accordance with predetermined states of the discharge lamp within a range between a predetermined upper limit frequency and a predetermined lower limit frequency;

determining, by an electrode condition determining unit, which is separate from the discharge lamp, that the deterioration of the two electrodes has exceeded: (1) if a voltage between the two electrodes has exceeded a predetermined voltage, (2) if the generation of a flicker in the discharge lamp has detected by an optical sensor, (3) if a reduction of the light intensity of the discharge lamp has detected by an optical sensor, or (4) based on a cumulative lighting time of the discharge lamp; and setting, in accordance with a first state and a second state, modulation patterns corresponding respectively to the first state and the second state so that the lower limit frequency in the first state if having determined that the deterioration of the two electrodes has been exceeded is higher than the lower limit frequency in the second state when having determined that the deterioration of the two electrodes has not been exceeded.

22. The driving device according to claim 10, the modulation pattern corresponding to the first state being a modulation pattern obtained by eliminating at least the period of the lower limit frequency from the periods included in the modulation pattern corresponding to the second state.

23. The driving device according to claim 10, the modulation pattern corresponding to the first state being a modulation pattern obtained by setting the frequency of each period of the modulation pattern corresponding to the second state to be a predetermined value higher than before.

24. The driving device according to claim 15, wherein, in the second state, the power of the alternating current is the rated power of the discharge lamp, and wherein, in the first state, the electric power of alternating current is lower than the rated power.

* * * * *